United States Patent
Holzer

(10) Patent No.: US 9,294,143 B1
(45) Date of Patent: Mar. 22, 2016

(54) CIRCULATOR USED AS A HIGH POWER TX/RX SWITCH

(71) Applicant: L-3 Communications Corp., New York, NY (US)

(72) Inventor: Kyle D. Holzer, Bountiful, UT (US)

(73) Assignee: L-3 Communications Corp., New York, NY (US)

( * ) Notice: Subject to any disclaimer, the term of this patent is extended or adjusted under 35 U.S.C. 154(b) by 43 days.

(21) Appl. No.: 14/303,962

(22) Filed: Jun. 13, 2014

(51) Int. Cl.
*H04B 1/44* (2006.01)
*H04B 1/48* (2006.01)

(52) U.S. Cl.
CPC ........................................ *H04B 1/48* (2013.01)

(58) Field of Classification Search
CPC .......................................................... H04B 1/48
USPC .............................................. 455/83, 78, 73
See application file for complete search history.

(56) References Cited

U.S. PATENT DOCUMENTS

| | | | | |
|---|---|---|---|---|
| 5,923,647 A * | 7/1999 | Dolman | ................... | H04B 1/48 370/280 |
| 6,078,422 A * | 6/2000 | Kosaka | ................ | H01S 3/1301 359/341.3 |
| 6,108,313 A * | 8/2000 | Lee | ........................ | H04B 1/005 333/1.1 |
| 6,160,660 A * | 12/2000 | Aina | ................... | H04B 10/2972 359/341.2 |
| 6,169,449 B1 * | 1/2001 | Hasegawa | ............. | H03F 1/0277 330/151 |
| 6,175,444 B1 * | 1/2001 | Toyohara | ........... | H04B 10/2971 359/341.2 |
| 6,201,904 B1 * | 3/2001 | Kato | ................... | G02B 6/02085 385/15 |
| 6,212,000 B1 * | 4/2001 | Ishikawa | ............. | H01S 3/10023 359/341.1 |
| 6,226,275 B1 * | 5/2001 | Yang | ........................ | H04B 1/44 370/280 |
| 6,374,087 B1 * | 4/2002 | Gressent | ................ | H04H 20/78 359/237 |
| 7,373,115 B2 * | 5/2008 | Monroe | .................... | H01P 1/15 333/101 |
| 7,440,496 B2 * | 10/2008 | Peek | ..................... | H04B 1/3877 375/219 |
| 7,616,940 B2 * | 11/2009 | Holder | ..................... | H04B 1/52 333/101 |
| 8,908,668 B2 * | 12/2014 | Kim | ........................ | H04B 1/525 310/311 |
| 2011/0032854 A1 * | 2/2011 | Carney | .................... | H04B 1/401 370/294 |
| 2011/0051628 A1 * | 3/2011 | Cohen | ...................... | H04B 1/18 370/278 |
| 2011/0143691 A1 * | 6/2011 | Van Aken | .............. | H04B 1/525 455/83 |
| 2014/0295779 A1 * | 10/2014 | Hasegawa | ............... | H01P 1/387 455/78 |
| 2015/0084808 A1 * | 3/2015 | Vacanti | .................... | G01S 7/41 342/122 |

* cited by examiner

*Primary Examiner* — Marceau Milord
(74) *Attorney, Agent, or Firm* — Brian Tucker; Kirton McConkie

(57) ABSTRACT

A circuit card can include a circulator for routing a signal from a first amplifier to an antenna and for routing a signal from the antenna to a second amplifier, replacing a traditional transfer switch. The circulator can be a surface mount element to enable the circulator, first amplifier, and second amplifier to be mounted on the same circuit card thereby minimizing the size of a transceiver that employs the circuit card. Multiple circulators can be included on the same circuit card to allow for multi-band operation.

19 Claims, 6 Drawing Sheets

CIRCULATOR USED AS A HIGH POWER TX/RX SWITCH

BACKGROUND

A transceiver is a device that includes both transmit (Tx) and receive (Rx) capabilities. Oftentimes, a transceiver will employ a single antenna to both transmit and receive signals. To enable the use of a single antenna, a switch is often used. For example, FIG. 1 illustrates a circuit diagram 100 of a typical transceiver that employs a switch 102 for controlling the function of the transceiver. In particular, switch 102 controls whether a signal received from a Tx amplifier 101a is output to antenna 103, or whether a signal received from antenna 103 will be routed to an Rx amplifier 101b.

Various problems exist with the circuit configuration depicted in FIG. 1. For example, switches are relatively lossy thereby limiting the performance of such circuits or requiring additional circuitry to account for the losses. Also, switches are currently incapable of relaying sufficient RF signal power at higher frequencies. In particular, the insertion loss of a switch is proportional to its operating frequency. Power that is dissipated due to the switch's insertion loss causes a temperature rise at the switch. If the temperature exceeds the switch's thermal limits, the switch can be irreversibly damaged. Additionally, the power that is dissipated in the switch is also proportional to the RF power transferring through the switch. This dissipated power also increases the temperature of the switch. For these reasons, transceivers that operate at higher frequencies (e.g. in the Ku Band) cannot be operated at sufficient power levels (e.g. 20 watts) for many applications due to the risk that the switch will be damaged from excessive temperatures.

Further, switches suitable for use at RF to millimeter wave frequencies are relatively large and are connectorized. Connectorized refers to the use of a coaxial connector attached directly to the RF component signal path used to route the intended signal between components via an RF cable assembly. For example, a connectorized component typically includes one or more coaxial connectors. In FIG. 1, these connectors are identified as elements 102a-102c. FIG. 2 also provides an example of a connectorized switch 202 that includes three coaxial connectors 202a-202c. Connectorized switch 202 is an example of a suitable switch that can be used as switch 102 in some transceiver implementations.

As can be seen, the connectors of a connectorized component increase the size of the component substantially. Also, because the connectors of a connectorized component are not directly connected to the circuit board, separate wires (such as coaxial cables) are required to connect other components to the connectorized components. Usage of connectorized components therefore requires a much larger overall system footprint and increases the weight of the transceiver. Further, the size of a connectorized component must increase with increased power loading to adequately dissipate temperature rise. Therefore, even if a connectorized switch is available at a high frequency (which is not the case at certain higher frequencies), the size of a suitable connectorized switch is oftentimes prohibitively large.

SUMMARY

In some embodiments, the present invention is implemented as a circuit card assembly that comprises a circulator having a first port, a second port, and a third port. The second port is configured to be connected to an antenna to allow radio frequency signals to be provided to the antenna and received from the antenna. The circuit card assembly also comprises a first amplifier having an output that is connected to the first port of the circulator such that radio frequency signals output by the first amplifier are output from the second port of the circulator. The circuit card assembly further comprises a second amplifier having an input that is connected to the third port of the circulator such that radio frequency signals input to the second port of the circulator are received at the input of the second amplifier.

The circulator may be a surface mount element. The circulator may be configured to operate at power levels up to 20 watts and/or at frequencies of at least 12 GHz. The first amplifier may be a power amplifier while the second amplifier may be a low noise amplifier. The circuit card assembly may also include a filter connected to the second port of the circulator for filtering radio frequency signals transmitted to and received from the antenna.

In some embodiments, the circuit card assembly may include a second circulator, a third amplifier, and a fourth amplifier. The second circulator may have a first port, a second port, and a third port. The second port may be configured to be connected to the antenna to allow radio frequency signals to be provided to the antenna and received from the antenna. The third amplifier may have an output that is connected to the first port of the second circulator such that radio frequency signals output by the third amplifier are output from the second port of the second circulator. The fourth amplifier may have an input that is connected to a third port of the second circulator such that radio frequency signals input to the second port of the second circulator are received at the input of the fourth amplifier. The first and second amplifiers may be configured to operate at different frequencies than the third and fourth amplifiers.

In some embodiments, the circuit card assembly may include a first filter connected to the second port of the circulator for filtering radio frequency signals transmitted to and received from the antenna, and a second filter connected to the second port of the second circulator for filtering radio frequency signals transmitted to and received from the antenna.

In some embodiments, the circuit card assembly may include a connector separate from the circulator for connecting the second port of the circulator to a separate assembly that includes the antenna. In some embodiments, the circuit card assembly may include a limiter connected between the third port of the circulator and the input to the second amplifier.

In other embodiments, the present invention is implemented as a system that comprises a circulator having a first port, a second port, and a third port. The second port is configured to be connected to an antenna to allow radio frequency signals to be provided to the antenna and received from the antenna, a first amplifier having an output that is connected to the first port of the circulator such that radio frequency signals output by the first amplifier are output from the second port of the circulator, and a second amplifier having an input that is connected to the third port of the circulator such that radio frequency signals input to the second port of the circulator are received at the input of the second amplifier. The circulator, the first amplifier, and the second amplifier are surface mounted on the same circuit card. The system may be configured to operate at frequencies about 12 GHz and at power levels of up to 20 watts.

In some embodiments, the system may include an antenna assembly that is separate from the circuit card. In such embodiments, the circuit card of the system may include a connector separate from the circulator for connecting the second port of the circulator to the antenna assembly.

In some embodiments, the system may include a second circulator, a third amplifier, and a fourth amplifier that are surface mounted on the circuit card. The second circulator may have a first port, a second port, and a third port. The second port may be configured to be connected to the antenna to allow radio frequency signals to be provided to the antenna and received from the antenna. The third amplifier may have an output that is connected to the first port of the second circulator such that radio frequency signals output by the third amplifier are output from the second port of the second circulator. The fourth amplifier may have an input that is connected to the third port of the second circulator such that radio frequency signals input to the second port of the second circulator are received at the input of the fourth amplifier.

In other embodiments, the present invention is implemented as a circuit card assembly that includes a first circulator having a first port, a second port, and a third port. The second port is configured to be connected to a first antenna to allow radio frequency signals to be provided to the first antenna and received from the first antenna. The circuit card assembly also includes a first amplifier having an output that is connected to the first port of the first circulator such that radio frequency signals output by the first amplifier are output from the second port of the first circulator, and a second amplifier having an input that is connected to the third port of the first circulator such that radio frequency signals input to the second port of the first circulator are received at the input of the second amplifier. The circuit card assembly further includes a second circulator having a first port, a second port, and a third port. The second port is configured to be connected to a second antenna to allow radio frequency signals to be provided to the second antenna and received from the second antenna. The circuit card assembly additionally includes a third amplifier having an output that is connected to the first port of the second circulator such that radio frequency signals output by the third amplifier are output from the second port of the second circulator, and a fourth amplifier having an input that is connected to a third port of the second circulator such that radio frequency signals input to the second port of the second circulator are received at the input of the fourth amplifier. The first amplifier outputs radio frequency signals that have a different frequency than radio frequency signals output by the third amplifier.

In some embodiments, the first circulator, the first amplifier, the second amplifier, the second circulator, the third amplifier, and the fourth amplifier are all surface mounted on the circuit card assembly. The second ports of the first and second circulators may both be connected to a separate connector that is also mounted on the circuit card assembly. The separate connector may be used to connect the second ports to a separate antenna assembly that includes the antenna.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," or "coupled to" are used herein, one element (e.g., a material, a layer, a substrate, etc.) can be "on," "attached to," or "coupled to" another element regardless of whether the one element is directly on, attached to, or coupled to the other element or there are one or more intervening elements between the one element and the other element. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

The term "surface mount" means that a component has leads that are designed to be soldered or otherwise attached on the same side of a circuit board or card on which the component is placed. The term "circulator" is used herein to represent a magnetic ferrite element with at least three ports that allows radio frequency signals to be transferred between adjacent ports only in one direction.

Figure 1:
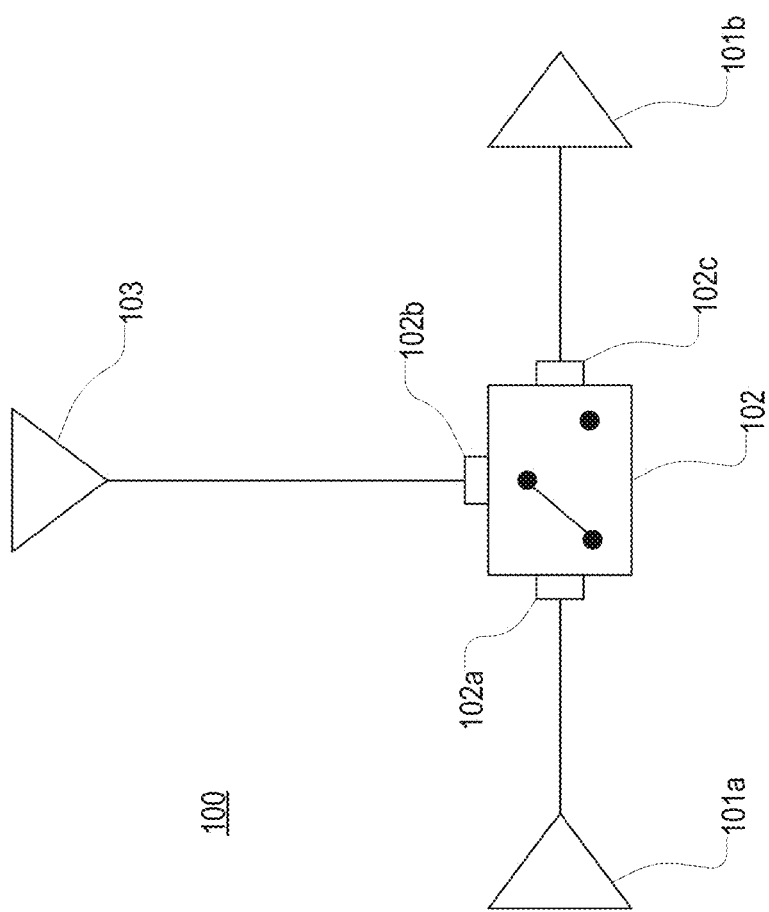
FIG. 1 illustrates a circuit diagram of a typical transceiver configuration in which a switch is employed to connect the Tx and Rx amplifiers to the antenna.
Figure 2:
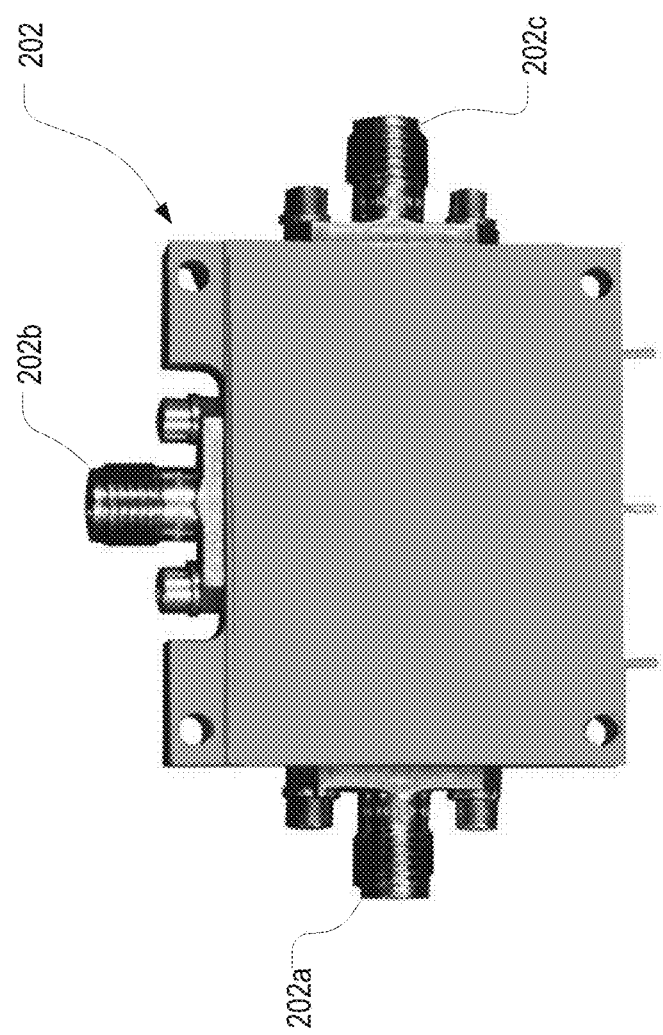
FIG. 2 illustrates an example prior art connectorized component.
Figure 3:
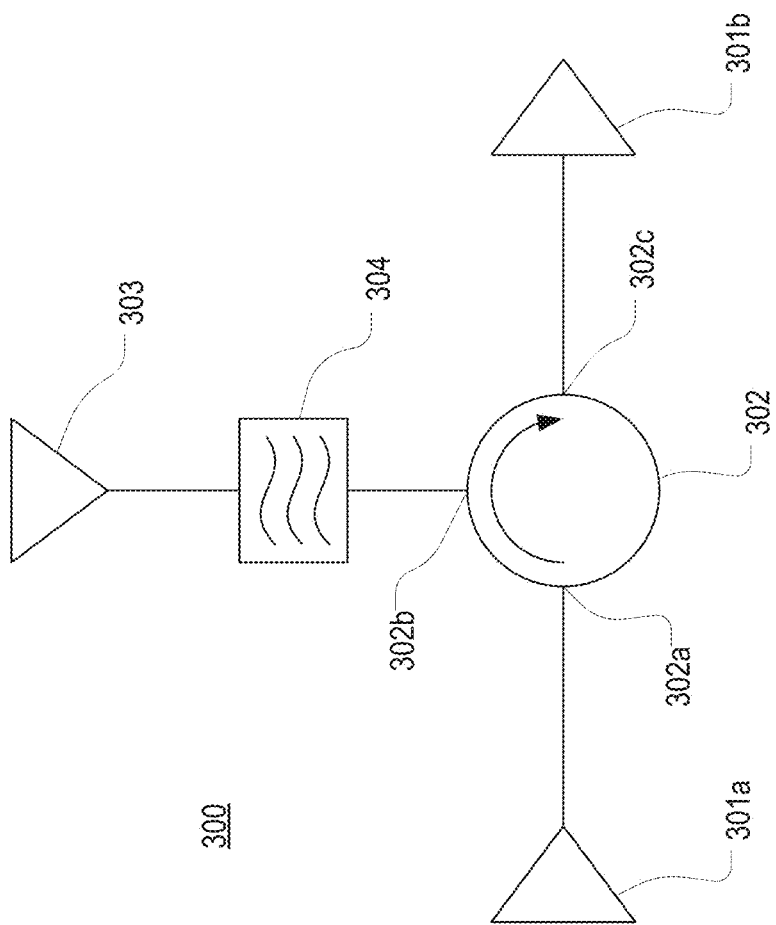
FIG. 3 illustrates an example circuit diagram in which a circulator is used as a Tx/Rx switch in accordance with one or more embodiments of the invention.

FIG. 3 illustrates an example circuit diagram 300 representing how a circulator 302 can be employed as a Tx/Rx switch. Circulator 302 is an example of a three port surface mount circulator that can be used to interconnect a Tx amplifier 301a and a Rx amplifier 301b to an antenna 303. Tx amplifier 301a can typically be a power amplifier while Rx amplifier 301b can typically be a low noise amplifier; however, other types of amplifiers could also be employed.

As shown, the output of Tx amplifier 301a is connected to a first port 302a of circulator 302. Circulator 302 is configured to operate in a clockwise direction as represented by the arrow in FIG. 3. Therefore, radio frequency signals output by Tx amplifier 301a will be allowed to pass from port 302a to port 302b and ultimately to antenna 303. In contrast, the input of Rx amplifier 301b is connected to a third port 302c of circulator 302. Therefore, radio frequency signals received by antenna 303 will be routed from port 302b to port 302c and ultimately to Rx amplifier 301b. Filter 304 can be configured with a passband to match the operational frequencies of Tx amplifier 301a and Rx amplifier 301b.

In some embodiments, the components depicted in circuit diagram 300 can be configured to operate at frequencies in excess of 12 GHz. For example, Tx amplifier 301a can be configured to output radio frequency signals in the Ku band (12-18 GHz). Additionally, the components depicted in circuit diagram 300 can be configured to operate at high power. For example, Tx amplifier 301a can be configured to operate at power levels up to or exceeding 20 watts.

To enable operation at these high frequencies and power levels, circulator 302 can be designed as a surface mount element. As a surface mount element, circulator 302 can provide high thermal conductivity connections to thermal vias formed within a circuit card. These high thermal conductivity connections dissipate heat generated by the high power operation thereby allowing circulator 302 to be relatively small since the circulator itself is not the primary heat sink. Additionally, as a surface mount element, circulator 302 can provide low loss transitions to minimize loss as the radio frequency signals pass between the ports of circulator 302. Low loss transitions are significantly beneficial for both Tx and Rx paths. On the Tx path, the low loss transitions provide a higher available output power at the antenna. On the Rx path, the low loss transitions provide increased sensitivity for low signal levels received from the antenna.

Because each of Tx amplifier 301a, circulator 302, Rx amplifier 301b, and filter 304 can be surface mount elements, each can be mounted on the same circuit card and only require a small footprint. In this way, the circuit card can be reduced in size in comparison to circuit cards that employ connectorized switches. For example, because no coaxial connectors or cables are required to interconnect each component, the complete circuit can have a much smaller footprint on the circuit card.

Although not shown in FIG. 3, second port 302b can be connected to a separate connector (e.g. a coaxial connector mounted to the circuit card) to which a separate antenna assembly may be connected. For example, each of the components depicted in FIG. 3 other than antenna 303 may be surface mounted on the same circuit card. The separate connector can be used to interconnect the circuit card with a separate antenna assembly such as by connecting a coaxial cable between the separate connector on the circuit card and the antenna assembly.

Figure 3A:
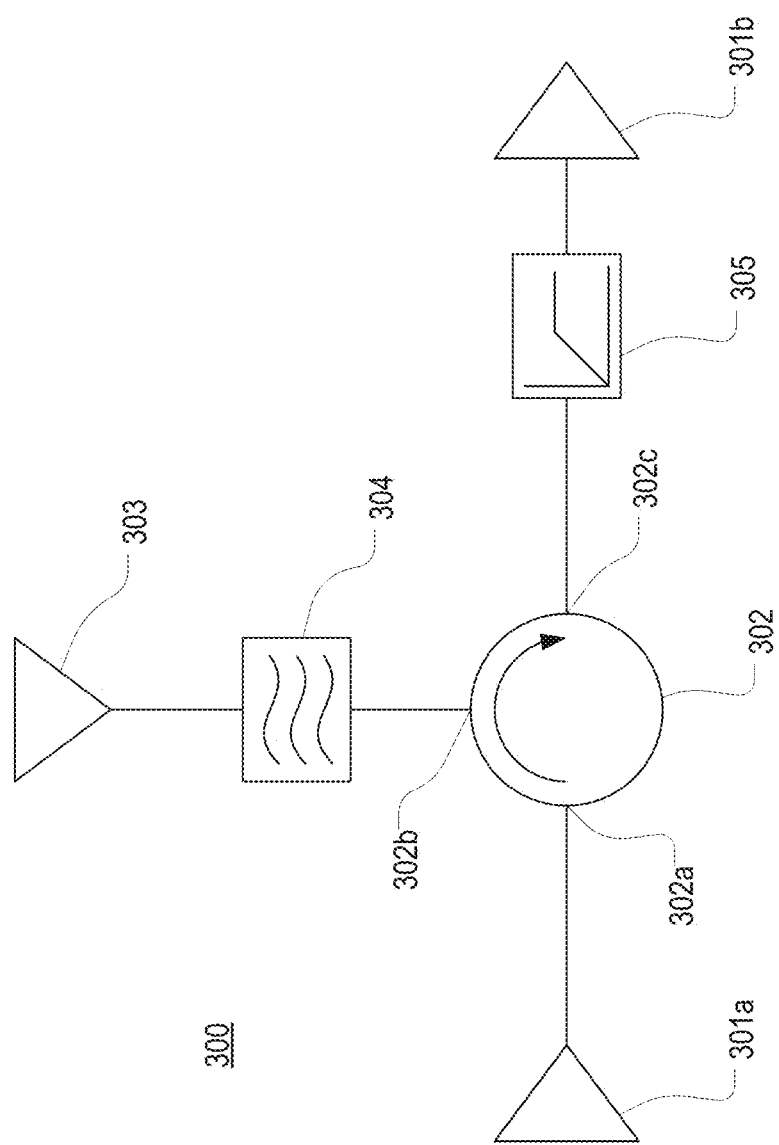
FIG. 3A illustrates a variation to the circuit of FIG. 3 that includes a limiter between the circulator and the Rx amplifier in accordance with one or more embodiments of the invention.

FIG. 3A illustrates a variation to circuit diagram 300. In FIG. 3A, the circuit also includes a limiter 305 positioned between port 302c of circulator 302 and the input to Rx amplifier 301b. Limiter 305 can be employed to minimize the power level of radio frequency signals that are reflected by antenna 303 or other components connected to port 302b (e.g. due to impedance mismatch). For example, if any or a portion of the radio frequency signals output by Tx amplifier 301a (which may be at a power level up to or exceeding 20 watts) are reflected by antenna 303, they will be routed towards Rx amplifier 301b. Limiter 305 can function to minimize the power level that will be able to pass through to the input of Rx amplifier 301b thereby protecting Rx amplifier 301b.

Figure 4:
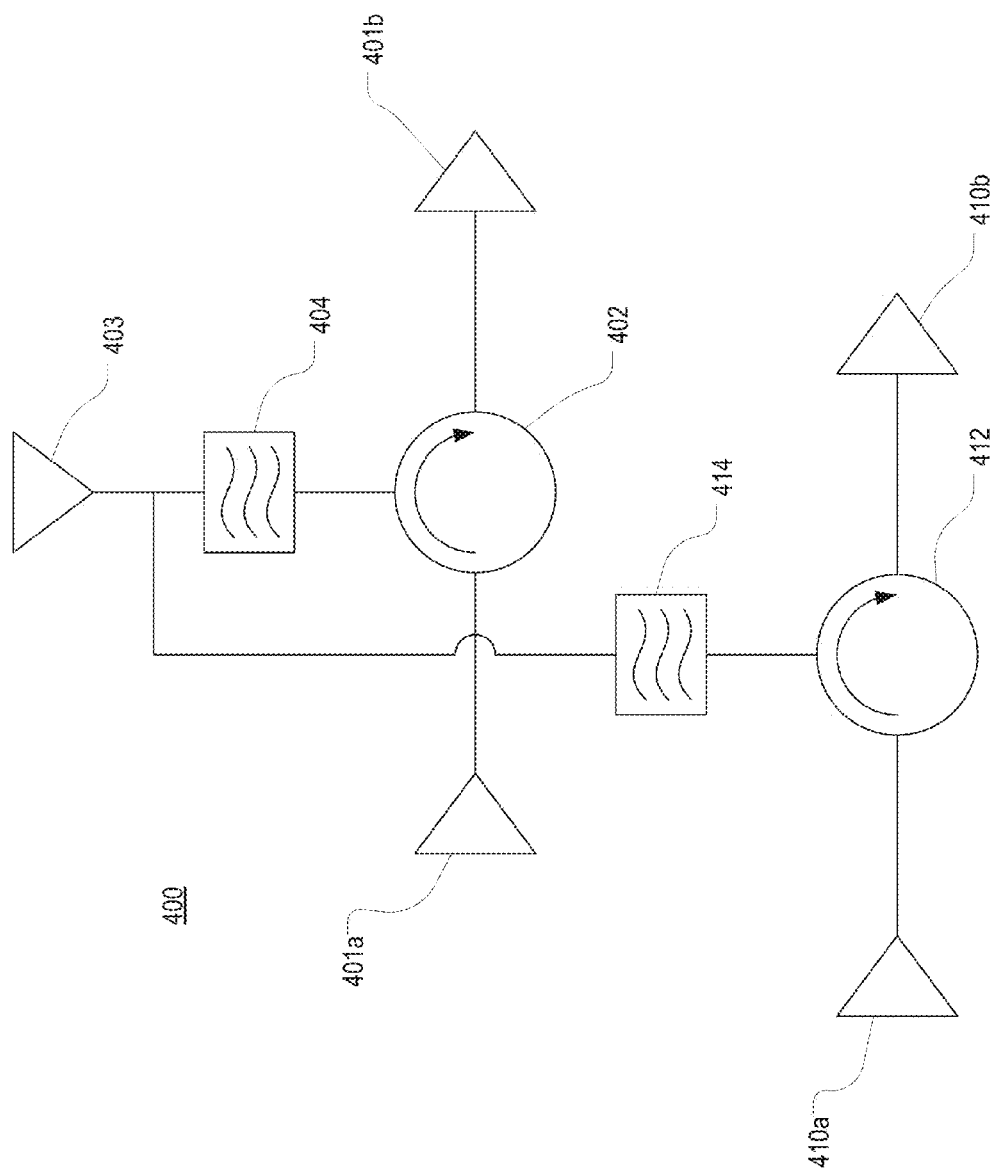
FIG. 4 illustrates another example circuit diagram in which two circulators are used as Tx/Rx switches to enable dual band operation.

FIG. 4 illustrates an example circuit diagram 400 representing how two circulators 402, 412 can be employed as Tx/Rx switches to enable dual band operation of a transceiver. Circuit diagram 400 includes a Tx amplifier 401a, a circulator 402, an Rx amplifier 401b, and a filter 404 that are arranged in the same manner as Tx amplifier 301a, circulator 302, Rx amplifier 301b, and filter 304 in circuit diagram 300.

Additionally, circuit diagram 400 includes a second set of components arranged in a similar manner, namely Tx amplifier 410a, circulator 412, Rx amplifier 410b, and filter 414. This second set of components can function in the manner described above except that they may be configured to operate at different frequencies. For example, Tx amplifier 401a and Tx amplifier 410a can be configured to output radio frequency signals at different frequencies. Similarly, Rx amplifier 401b and Rx amplifier 410b can be configured to receive radio frequency signals at different frequencies. In this way, the transceiver can transmit and/or receive over two different bands. Although not shown, a limiter can be used with Rx amplifiers 401b and 410b as described with respect to FIG. 3A.

The second port of each of circulator 402 and circulator 412 (which are not labeled in circuit diagram 400 for sake of clarity) are both connected to antenna 403. For example, the second port of each circulator may be connected to traces that join and connect to a separate connector to which an antenna assembly containing antenna 403 could be connected.

Figure 5:
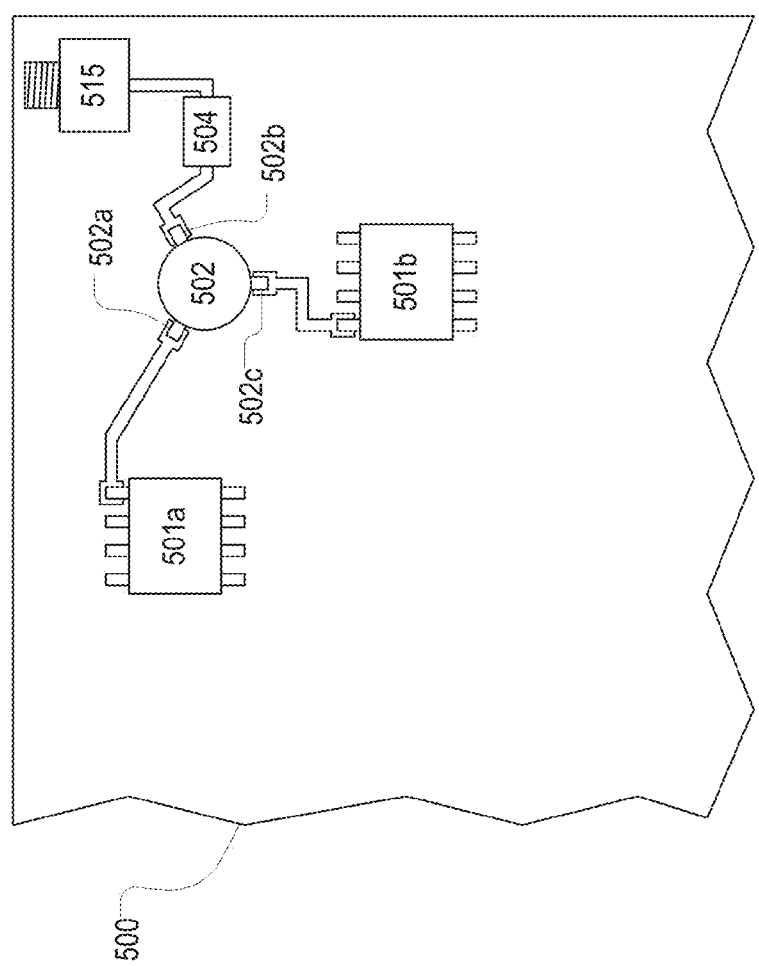
FIG. 5 illustrates a portion of an example circuit card assembly on which surface mount amplifiers and a circulator are employed in accordance with the techniques of the present invention.

FIG. 5 illustrates a portion of an example circuit card assembly on which surface mount amplifiers and a circulator are employed. A circulator 502 is surface mounted on circuit card 500 and has three ports. A first port 502a is connected to the output of a Tx amplifier 501a. A second port 502b is connected to a connector 515 via a filter 504. A third port 502c is connected to the input of an Rx amplifier 501b. As shown, each of Tx amplifier 501a, circulator 502, Rx amplifier 501b, and filter 504 are surface mounted.

Although Tx amplifier 501a, circulator 502, and Rx amplifier 501b are shown with leads, any of these component could also be configured without leads as is known in the art. Similarly, filter 504, which is shown without leads, could also be configured with leads.

Connector 515 is used to connect second port 502b to a separate antenna assembly. As shown, connector 515 represents a coaxial connector to which a coaxial cable could be connected for interconnecting the transceiver configuration of circuit card 500 with an antenna on the separate antenna assembly. Any other type of suitable connector could also be used.

In some embodiments, filter 504 can be located off the circuit card allowing second port 502b to be directly connected to connector 515. This will allow flexibility in the type of filter that is used as filter 504 in a particular implementation.

By employing surface mount elements for Tx amplifier 501a, circulator 502, and Rx amplifier 501b, a much smaller footprint is required for these components. For example, if connectorized switch 202 were used in place of circulator 502, a much larger footprint would be required. Specifically, switch 202 itself, due primarily to coaxial connectors 202a-202c, would require a much larger footprint than surface mount circulator 502. Additionally, in order to interconnect Tx amplifier 401a, Rx amplifier 401b, and filter 404 with switch 202, Tx amplifier 401a, Rx amplifier 401b, and filter 404 would also require coaxial connectors thereby increasing the footprint required by these components. Further, additional coaxial cables would be required to interconnect the components. Accordingly, the use of surface mount components can greatly reduce the size and weight of a circuit card assembly.

Although specific embodiments and applications of the invention have been described in this specification, these embodiments and applications are exemplary only, and many variations are possible.

I claim:

1. A circuit card assembly comprising:
    a circulator having a first port, a second port, and a third port, the second port being configured to be connected to an antenna to allow radio frequency signals to be provided to the antenna and received from the antenna;
    a first amplifier having an output that is connected to the first port of the circulator such that radio frequency signals output by the first amplifier are output from the second port of the circulator;
    a second amplifier having an input that is connected to the third port of the circulator such that radio frequency signals input to the second port of the circulator are received at the input of the second amplifier; and
    a power limiter connected between the third port of the circulator and the input to the second amplifier, the power limiter configured to limit power input to the second amplifier reflected from the antenna.

2. The circuit card assembly of claim 1, wherein the circulator is a surface mount element.

3. The circuit card assembly of claim 2, wherein the circulator is configured to operate at power levels up to 20 watts.

4. The circuit card assembly of claim 1, wherein the circulator is configured to operate at frequencies of at least 12 GHz.

5. The circuit card assembly of claim 1, wherein the first amplifier is a power amplifier.

6. The circuit card assembly of claim 1, wherein the second amplifier is a low noise amplifier.

7. The circuit card assembly of claim 1, further comprising:
    a filter connected to the second port of the circulator for filtering radio frequency signals transmitted to and received from the antenna.

8. The circuit card assembly of claim 1, wherein the circuit card assembly includes a connector separate from the circulator for connecting the second port of the circulator to a separate assembly that includes the antenna.

9. A circuit card assembly comprising:
    a circulator having a first port, a second port, and a third port, the second port being configured to be connected to an antenna to allow radio frequency signals to be provided to the antenna and received from the antenna;
    a first amplifier having an output that is connected to the first port of the circulator such that radio frequency signals output by the first amplifier are output from the second port of the circulator;
    a second amplifier having an input that is connected to the third port of the circulator such that radio frequency signals input to the second port of the circulator are received at the input of the second amplifier;
    a second circulator having a first port, a second port, and a third port, the second port being configured to be connected to the antenna to allow radio frequency signals to be provided to the antenna and received from the antenna;
    a third amplifier having an output that is connected to the first port of the second circulator such that radio frequency signals output by the third amplifier are output from the second port of the second circulator; and
    a fourth amplifier having an input that is connected to a third port of the second circulator such that radio frequency signals input to the second port of the second circulator are received at the input of the fourth amplifier.

10. The circuit card assembly of claim 9, wherein the first amplifier and the second amplifier operate at different frequencies from the third and fourth amplifiers.

11. The circuit card assembly of claim 9, further comprising:
    a first filter connected to the second port of the circulator for filtering radio frequency signals transmitted to and received from the antenna; and
    a second filter connected to the second port of the second circulator for filtering radio frequency signals transmitted to and received from the antenna.

12. A system comprising:
    a circulator having a first port, a second port, and a third port, the second port being configured to be connected to an antenna to allow radio frequency signals to be provided to the antenna and received from the antenna;
    a first amplifier having an output that is connected to the first port of the circulator such that radio frequency signals output by the first amplifier are output from the second port of the circulator;
    a second amplifier having an input that is connected to a third port of the circulator such that radio frequency signals input to the second port of the circulator are received at the input of the second amplifier;
    wherein the circulator, the first amplifier, and the second amplifier are surface mounted on the same circuit card,
    the system further comprising a power limiter connected between the third port of the circulator and the input to the second amplifier, the power limiter configured to limit power input to the second amplifier reflected from the antenna.

13. The system of claim 12, further comprising:
    an antenna assembly that is separate from the circuit card.

14. The system of claim 13, wherein the circuit card further includes a connector separate from the circulator for connecting the second port of the circulator to the antenna assembly.

15. The system of claim 12, wherein the system is configured to operate at frequencies above 12 GHz.

16. The system of claim 12, wherein the circulator is configured to transmit up to 20 watts of radio frequency power.

17. A system comprising:
    a circulator having a first port, a second port, and a third port, the second port being configured to be connected to an antenna to allow radio frequency signals to be provided to the antenna and received from the antenna;
    a first amplifier having an output that is connected to the first port of the circulator such that radio frequency signals output by the first amplifier are output from the second port of the circulator;
    a second amplifier having an input that is connected to a third port of the circulator such that radio frequency signals input to the second port of the circulator are received at the input of the second amplifier, wherein the circulator, the first amplifier, and the second amplifier are surface mounted on the same circuit card;
    a second circulator having a first port, a second port, and a third port, the second port being configured to be connected to the antenna to allow radio frequency signals to be provided to the antenna and received from the antenna;
    a third amplifier having an output that is connected to the first port of the second circulator such that radio frequency signals output by the third amplifier are output from the second port of the second circulator; and
    a fourth amplifier having an input that is connected to the third port of the second circulator such that radio frequency signals input to the second port of the second circulator are received at the input of the fourth amplifier, wherein the second circulator, the third amplifier, and the fourth amplifier are surface mounted on the circuit card.

18. A circuit card assembly comprising:

a first circulator having a first port, a second port, and a third port, the second port being configured to be connected to an antenna to allow radio frequency signals to be provided to the antenna and received from the antenna;

a first amplifier having an output that is connected to the first port of the first circulator such that radio frequency signals output by the first amplifier are output from the second port of the first circulator;

a second amplifier having an input that is connected to the third port of the first circulator such that radio frequency signals input to the second port of the first circulator are received at the input of the second amplifier;

a second circulator having a first port, a second port, and a third port, the second port being configured to be connected to the antenna to allow radio frequency signals to be provided to the antenna and received from the antenna;

a third amplifier having an output that is connected to the first port of the second circulator such that radio frequency signals output by the third amplifier are output from the second port of the second circulator; and a fourth amplifier having an input that is connected to a third port of the second circulator such that radio frequency signals input to the second port of the second circulator are received at the input of the fourth amplifier;

wherein the first and second amplifiers operate at radio frequencies different from the third and fourth amplifiers.

19. The circuit card assembly of claim 18, wherein the first circulator, the first amplifier, the second amplifier, the second circulator, the third amplifier, and the fourth amplifier are all surface mounted on the circuit card assembly, and wherein the second ports of the first and second circulators are both connected to a separate connector that is also mounted on the circuit card assembly, the separate connector for connecting the second ports to a separate antenna assembly that includes the antenna.

* * * * *